United States Patent
Yoon

Patent Number: 5,933,199
Date of Patent: Aug. 3, 1999

[54] GAMMA CORRECTION CIRCUIT USING ANALOG MULTIPLIER

[75] Inventor: Sang Young Yoon, Inchun-si, Rep. of Korea

[73] Assignee: LG Electronics Inc., Seoul, Rep. of Korea

[21] Appl. No.: 08/656,898

[22] Filed: Jun. 3, 1996

[30] Foreign Application Priority Data

Sep. 15, 1995 [KR] Rep. of Korea ......... 95-30189
Jan. 26, 1996 [KR] Rep. of Korea ......... 96-1767

[51] Int. Cl.[6] .............. H04N 5/202; H04N 9/69
[52] U.S. Cl. ............ 348/674; 348/254; 348/790
[58] Field of Search .................. 348/674, 677, 348/254, 255, 256, 675, 676, 790; 358/32, 164; H04N 5/202, 5/20, 9/69

[56] References Cited

U.S. PATENT DOCUMENTS

| | | | |
|---|---|---|---|
| 4,015,079 | 3/1977 | Satou et al. | 348/677 |
| 4,589,021 | 5/1986 | Sato et al. | 348/677 |
| 4,651,148 | 3/1987 | Takeda et al. | |
| 4,686,562 | 8/1987 | Yamanaka | 348/677 |
| 5,065,247 | 11/1991 | Haruki | 348/254 |
| 5,079,622 | 1/1992 | Toshinobu | 348/254 |
| 5,408,267 | 4/1995 | Main | 348/674 |
| 5,459,531 | 10/1995 | Park | 348/677 |
| 5,473,373 | 12/1995 | Hwung | 348/254 |
| 5,481,317 | 1/1996 | Hieda | 348/674 |
| 5,610,666 | 3/1997 | Ueda et al. | 348/674 |
| 5,671,023 | 9/1997 | Nishiwaki et al. | 348/674 |
| 5,710,594 | 1/1998 | Kim | 348/674 |

FOREIGN PATENT DOCUMENTS

| | | | |
|---|---|---|---|
| 63-92171 | 4/1988 | Japan | H04N 5/202 |
| 01267694 | 10/1989 | Japan | |
| 04107594 | 9/1992 | Japan | |
| 5-244460 | 9/1993 | Japan | H04N 5/202 |
| 08009198 | 1/1996 | Japan | H04N 5/202 |
| 08018826 | 1/1996 | Japan | H04N 5/202 |
| 08032837 | 2/1996 | Japan | H04N 5/202 |
| WO 94/14276 | 6/1994 | WIPO | H04N 5/202 |

OTHER PUBLICATIONS

S. Ohi et al., "A 13–in.–Diagonal Full–Color High–Resolution TFT–LCD with a New Analog Signal Conversion Scheme", SID 93 Digest, pp. 7–10 (1993).

*Primary Examiner*—John K. Peng
*Assistant Examiner*—Jean W. Désir
*Attorney, Agent, or Firm*—Finnegan, Henderson, Farabow, Garrett & Dunner, L.L.P.

[57] ABSTRACT

A gamma correction circuit for use in a liquid crystal display device includes a comparator that receives an input data voltage and preferably three reference voltages. In response to these signals, the comparator outputs an input data comparison signal, which is supplied to first and second analog switches. The first and second analog switches select and respectively output a weight voltage and a correction voltage in response to the input data comparison signal. The selected correction voltages is then either added or subtracted from the input data voltage, and the resulting sum or difference is multiplied by the selected weight voltage using an analog multiplier.

35 Claims, 7 Drawing Sheets

GAMMA CORRECTION CIRCUIT USING ANALOG MULTIPLIER

BACKGROUND OF THE INVENTION

The present invention relates to a gamma correction circuit using an analog multiplier, and more particularly, to a gamma correction circuit for overcoming electro-optic nonlinearity associated with liquid crystal material to maintain a linear output while driving a liquid crystal display panel.

Figure 1:
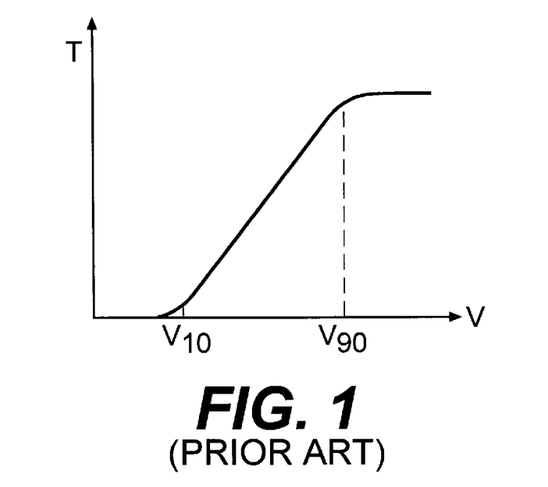
FIG. 1 is a graph showing the electrooptic characteristic of a liquid crystal display (LCD)

Recently, improved LCD picture quality has been required to take advantage of advanced video signal input/output technology and a variety of new video media. Suitable liquid crystal materials for these applications exhibit a gray scale over a range of applied voltages. That is, for a given liquid crystal material, transmittance increases generally with increasing voltage. The relationship between applied voltage and transmittance, however, is not linear. For example, as shown in FIG. 1, which is a typical electrooptic characteristic of an LCD, transmittance as a function of applied voltage is not linear around $V_{10}$ and $V_{90}$. The curve shown in FIG. 1 is commonly referred to as the "gamma", and circuitry used to compensate for these nonlinearities is known as "gamma correction" circuitry.

Gamma correction circuits linearly correct the transmissivity characteristic of a liquid crystal over predetermined nonlinear portion of the characteristic. Typically the gamma correction circuit increases the amplification rate over the nonlinear portions in a chrominance demodulation circuit.

Conventional gamma correction circuits, however, are limited to correcting in either a digital or analog mode. They are also very complicated to make and they frequently generate an unstable video signal output.

Figure 2:
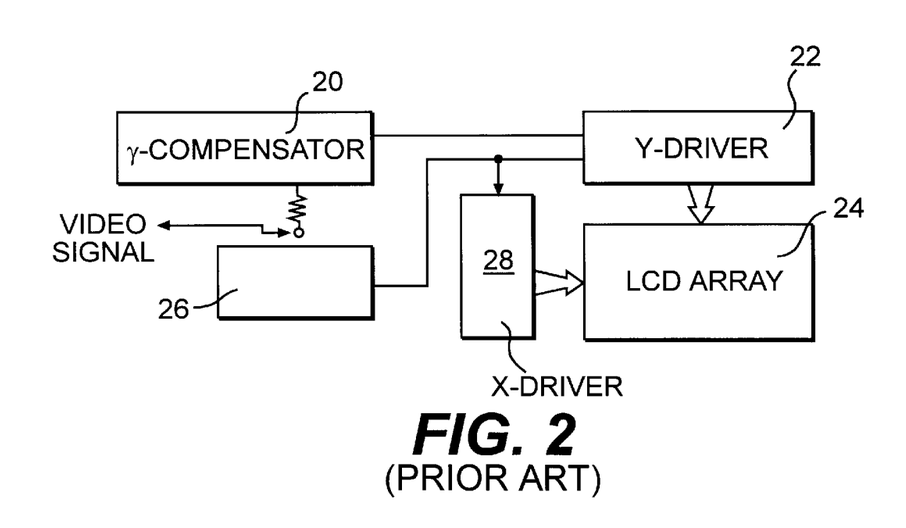
FIG. 2 is a block diagram of an LCD driver having a conventional gamma correction circuit.

FIG. 2 is a block diagram of an LCD driver having the conventional gamma correction circuit, which controls the amplification rate of the nonlinear portions in the chrominance demodulation block when a video signal is applied to an LCD pixel. The video signal, having a controlled amplification rate, is supplied to a gamma compensator circuit 20, which, in turn, feeds a gamma compensated value to the Y-driver 22 of the LCD array 24. A controller outputs horizontal and vertical sync signals to the X and Y drivers, 22 and 28, respectively. The X and Y drivers then supply appropriate signals to drive the LCD array 24.

Figure 3:
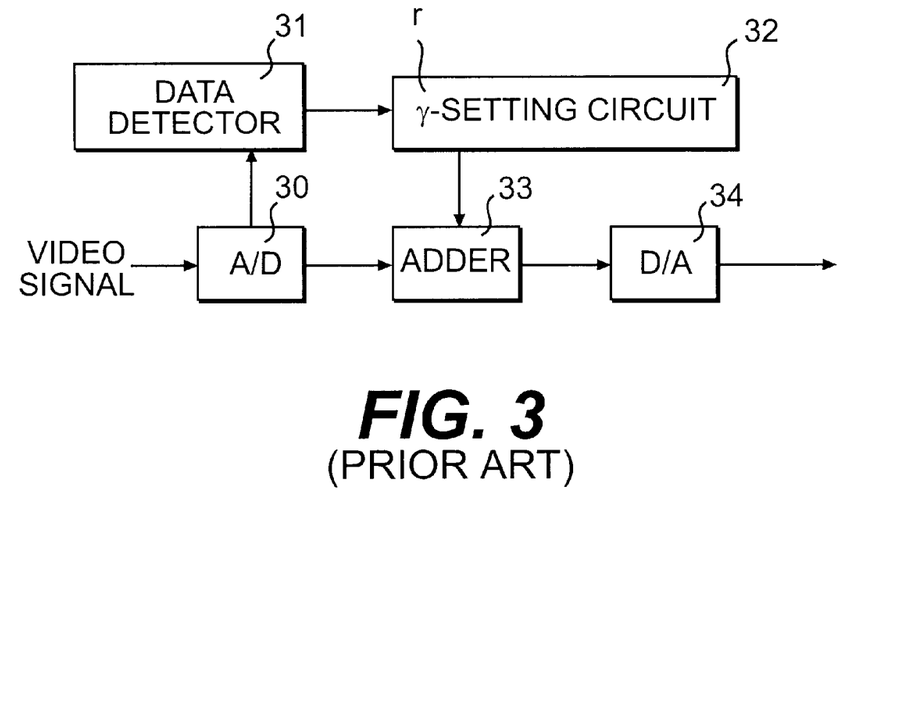
FIG. 3 is a block diagram of a conventional digital gamma correction circuit.
Figure 4:
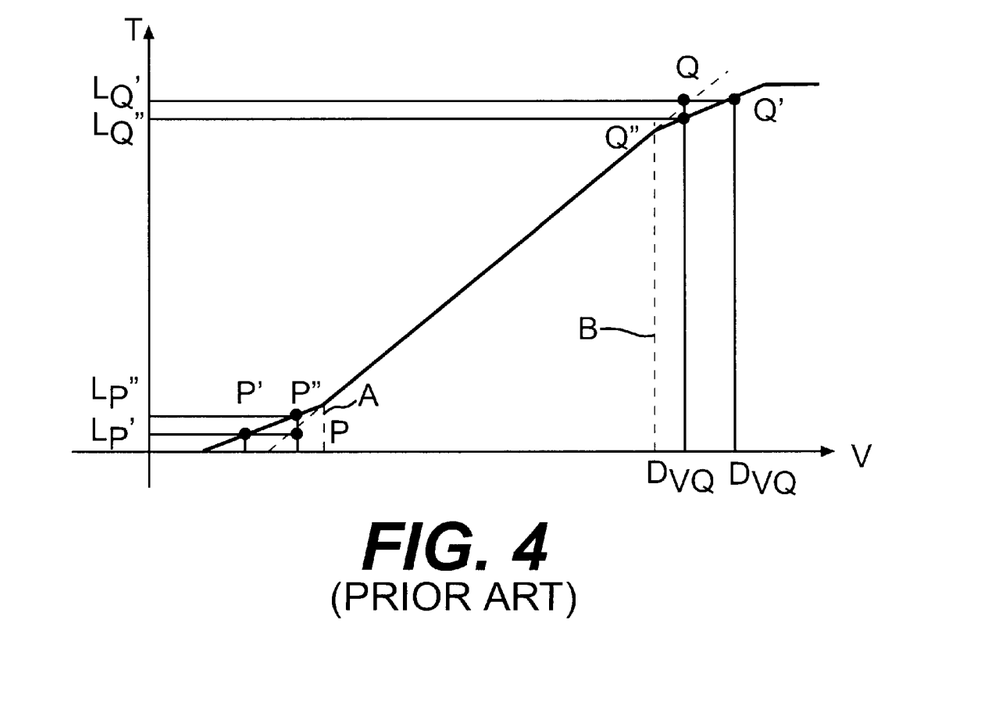
FIG. 4 is a graph of a gamma correction characteristic for a conventional digital gamma correction circuit.

FIG. 3 is a block diagram illustrating a conventional digital gamma correction circuit in greater detail. As shown in FIG. 3, the gamma correction circuit receives a video signal and sets a proper gamma value for correction. FIG. 4 is a graph showing the input/output characteristic of the conventional digital gamma correction circuit. The conventional gamma correction techniques will now be discussed with reference to FIGS. 3 and 4.

As seen in FIG. 3, A/D converter 30 receives an analog input video signal and converts it into a digital signal. This digital signal is detected in a data detector 31. A gamma setting circuit 32 establishes a gamma value for the detected signal by retrieving a predetermined gamma value from a ROM look-up table (not shown). The output of gamma setting circuit 32 is then supplied to an adder 33, which sums the signal output from A/D converter 30 and the signal output from gamma setting circuit 32. The summed result is output to a D/A converter 34, which converts the digital signal output from adder 33 into analog, and feeds the converted signal to a TFT pixel. Through this process, gamma correction is performed.

In FIG. 4, correction for an arbitrary point P is carried out as follows. When a data input voltage $D_{VP}$ at point P is output without gamma correction, the corresponding transmissivity of the input voltage becomes $L_P''$. This causes the transmissivity to be nonlinear over the entire range of input data voltages. However, when input data voltage $D_{VP}'$ at point P' is applied to the pixel, the transmissivity becomes $L_P$, which is at a linear portion of the transmissivity characteristic curve.

Accordingly, the gamma set value becomes $D_{VP}-D_{VP}'$ because value $D_{VP}'$ must be input instead of value $D_{VP}$. The gamma set value varies with respect to the respective input data voltages of the nonlinear portions. The section from point A to point B in the graph shown in FIG. 4 has a linear transmissivity, requiring no gamma correction. Thus, when input data voltage $D_{VQ}'$ at point Q' is applied to the pixel, transmissivity becomes $L_Q''$ and the characteristic becomes linear. If, however, the input voltage is Q, the output voltage is $D_{VQ}'$ which is at a nonlinear portion of the transmissivity characteristic curve.

As discussed above, the digital gamma correction circuit performs D/A or A/D conversion with respect to the analog data signal. In converting the analog data into digital or the digital data into analog, round-off errors occur and data is frequently not expressed accurately. As a result, the number of gray scales or gradations which can be gamma corrected is limited.

Figure 5:
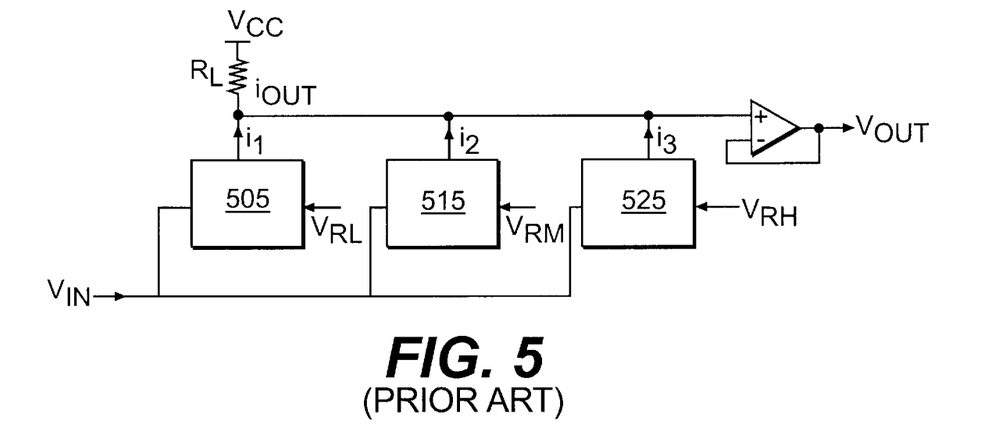
FIG. 5 is a block diagram of a conventional analog gamma correction circuit.
Figure 6:
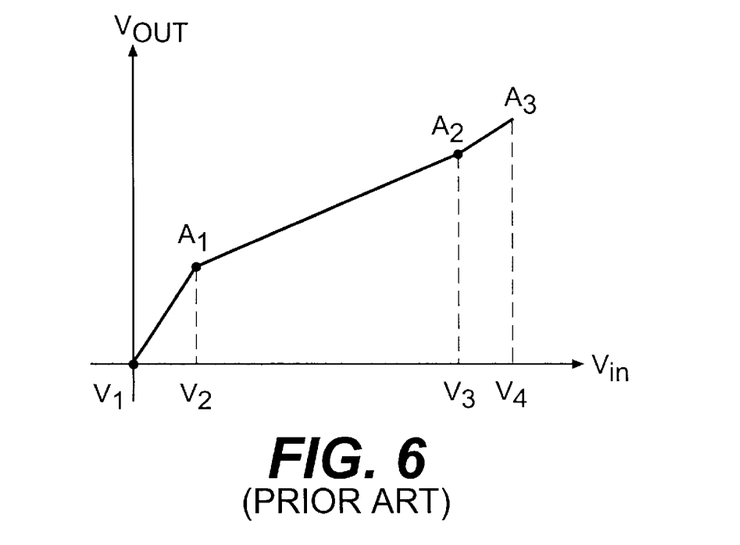
FIG. 6 is a graph showing the input/output characteristic of a conventional gamma correction circuit.

FIG. 5 is a block diagram of a conventional analog gamma correction circuit, which forms a gamma-corrected output using several differential amplifiers. FIG. 6 is a graph showing the input/output characteristic of this gamma correction circuit. The conventional analog gamma correction will now be explained below with reference to FIGS. 5 and 6.

As seen in FIG. 5, three reference voltages $V_{RL}$, $V_{RM}$ and $V_{RH}$ are applied to the respective differential amplifiers 505, 515 and 525, each of which having different gains and operating within different voltage ranges. Because the output current of each respective differential amplifier is $I_{out}=$ GM(Vin−Vout), current $i_{out}$ flowing through a load resistor $R_L$ becomes $i_1+i_2+i_3$, which is controlled according to the input voltage range. An input/output characteristic of the gamma correction circuit is thus obtained, as shown in FIG. 6. The conventional analog gamma correction circuit shown in FIG. 5, however, uses more than three differential amplifiers, and is thus complicated.

As mentioned above, the digital gamma correction circuit causes round-off error in converting the analog data into digital or converting digital data into analog, thereby limiting the number of gradations for gamma correction. Further, the analog gamma correction circuit uses more than three differential amplifiers, and is therefore a very complicated circuit. Neither the conventional analog nor digital circuits can provide suitable gamma correction of the input signal.

SUMMARY OF THE INVENTION

Therefore, it is an object of the present invention to provide a gamma correction circuit using a conventional analog multiplier for performing gamma correction with respect to an input data signal.

To accomplish the object of the present invention, there is provided a gamma correction circuit for making linear the nonlinearity electrooptic characteristics of a liquid crystal display, the circuit comprising: a comparator for receiving an input data voltage and comparing it with three reference voltages, to thereby output an input data comparison signal; a first analog switch for receiving the input data comparison signal, which is the output signal of the comparator, and selecting and outputting a weight voltage corresponding to the signal; a second analog switch for receiving the input data comparison signal, which is the output signal of the comparator, and selecting and outputting a correction voltage corresponding to the signal; and an analog multiplier for receiving the input data voltage, the weight voltage of the first analog switch, and the correction voltage which is the output of the second analog switch, and outputting a final voltage.

DETAILED DESCRIPTION OF THE INVENTION

Hereinafter, a preferred embodiment of the present invention will be described with reference to the attached drawings. Wherever possible, the same reference numbers will be used throughout the drawings to refer to the same or like parts.

Figure 7:
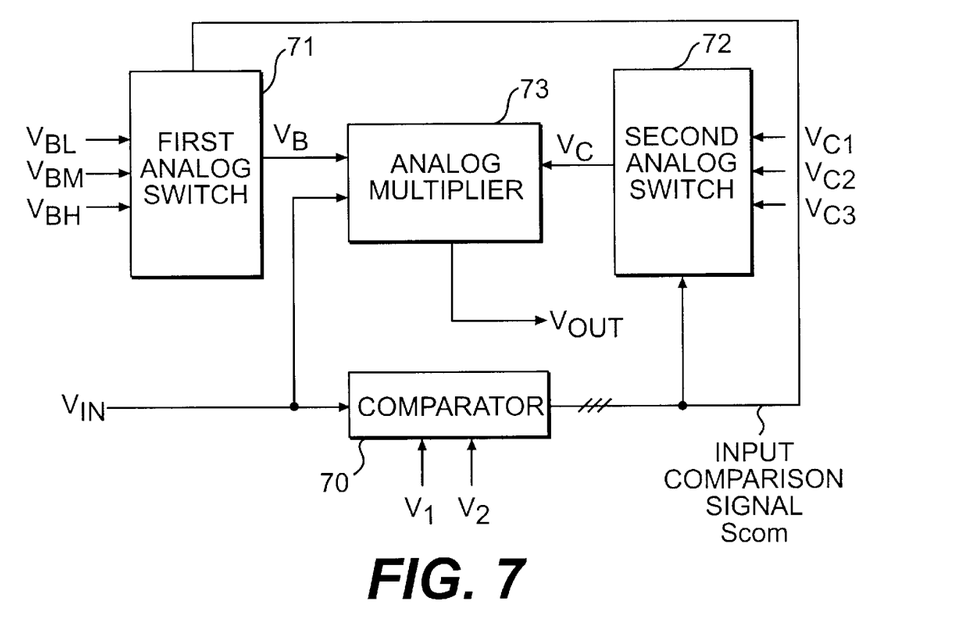
FIG. 7 is a block diagram of one embodiment of a gamma correction circuit using an analog multiplier in accordance with the present invention.

As shown in FIG. 7, a gamma correction circuit in accordance with a preferred embodiment with the present invention includes an analog multiplier having a comparator 70, first analog switch 71, second analog switch 72, and analog multiplier 73.

Comparator 70 receives two reference voltages V1 and V2 and a data input voltage Vin. A comparison is then made to determine whether the input voltage falls within a first range less than a first threshold voltage determined by a first reference voltage V1, a second range between the first threshold voltage and a second threshold voltage determined by reference voltage V2, or a third range above the second threshold voltage. An input data comparison signal Scom is then output in accordance with the range in which the input data voltage falls. Namely, three output lines are connected to comparator 70 and one of these lines goes high in accordance with the range in which the data input voltage Vin falls.

It should be noted, however, that although two reference voltages have been described above, any appropriate number may be used in accordance with the input data voltage and panel characteristics.

The three output lines from comparator 70 are supplied to first and second analog switches 71 and 72, respectively. As will be discussed in greater detail below, the first analog switch 71 selects one of weight voltages $V_{B1}$, $V_{B2}$, and $V_{B3}$ and outputs it as weight voltage $V_B$ in response to one of the three output lines going high. In addition, second analog switch 72 selects a corresponding correction voltage $V_c$ among $V_{c1}$, $V_{c2}$ and $V_{c3}$ in response to the one output line going high.

Input data voltage Vin, weight voltage $V_B$ and correction voltage $V_c$ are then supplied to analog multiplier 73, which adds $V_c$ to Vin, and multiplies the sum by the weight voltage $V_B$. The resulting product is output as a gamma corrected voltage. Alternatively, $V_c$ can be subtracted from Vin by adding a negative value of $V_c$ to Vin.

Figure 8A:
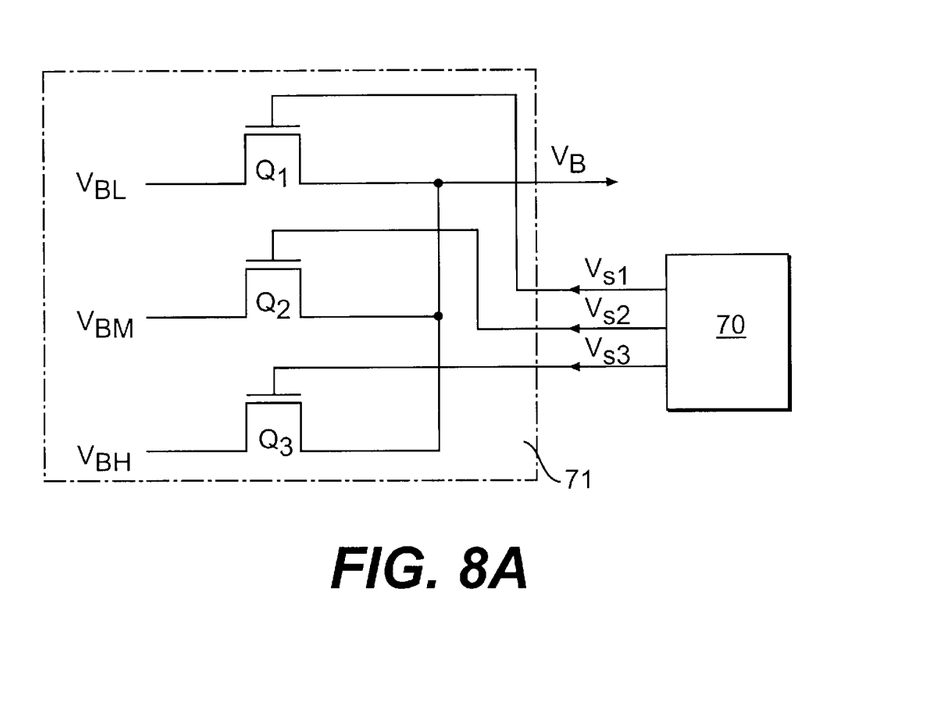
FIGS. 8A and 8B are circuit diagrams illustrating an analog switch in the analog multiplier in accordance with the present invention.
Figure 8B:
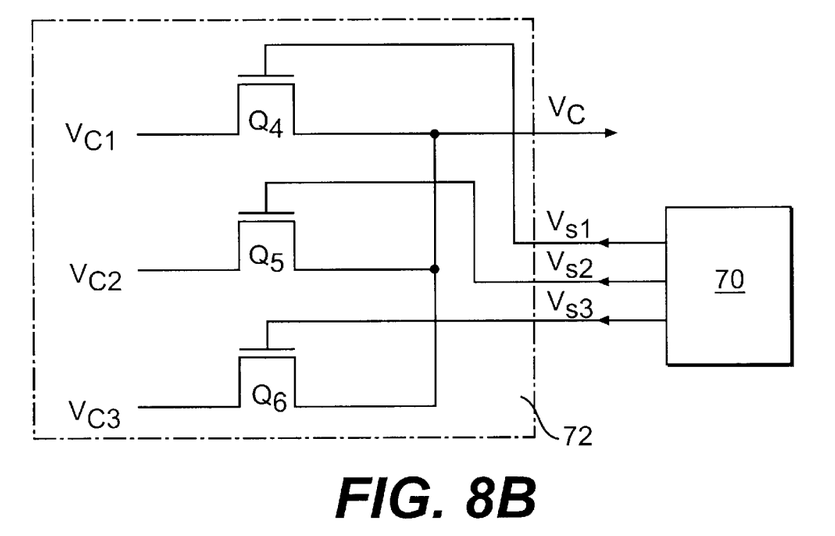

FIGS. 8A and 8B are circuit diagrams illustrating in greater detail the structure of first and second analog switches 71 and 72, respectively. As seen in FIG. 8A, first analog switch 71 comprises first, second and third transistors Q1, Q2 and Q3, the sources of which being coupled to weight voltages $V_{BL}$, $V_{BM}$, and $V_{BH}$, respectively. The gates of transistors Q1–Q3 respectively receive one of the three output lines from comparator 70. Accordingly, when one of the output lines from comparator 70 goes high, one of transistors Q1–Q3 is rendered conductive to supply a corresponding one of weight voltages $V_{BL}$, $V_{BM}$ and $V_{BH}$ as the output weight voltage $V_B$.

As seen in FIG. 8B, second analog switch 72 comprises fourth, fifth and sixth transistors Q4, Q5 and Q6, having correction voltages $V_{C1}$, $V_{C2}$, and $V_{C3}$ applied, respectively to the sources thereof. The gates of these transistors receive reference voltages $V_{C1}$, $V_{C2}$ and $V_{C3}$, and the drain potentials are coupled to generate output drain correction voltage $V_C$ in response to a logic high on one of the output lines from comparator 70.

Figure 9:
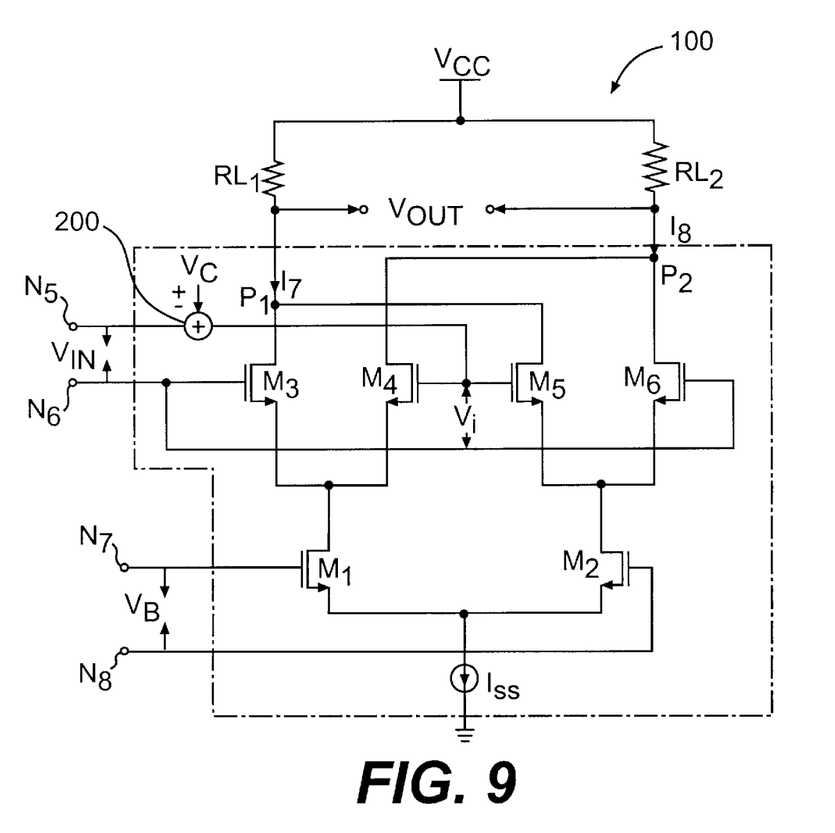
FIG. 9 is a circuit diagram of an MOS Gilbert cell used in the analog multiplier of the gamma correction circuit in accordance with the present invention.

As seen in FIG. 9, analog multiplier 73 includes an MOS Gilbert Cell 100 (as disclosed in "IEEE Journal of Solid-State Circuits, vol. Sc-20, No. 6, December 1985 pp. 1158–1168) and an adder 200. As noted above, analog multiplier 73 adds correction voltage $V_c$ from second analog switch 72 to input data voltage Vin to generate a sum, which is then multiplied by the weight voltage $V_B$ output from the first analog switch 71.

As illustrated in detail in FIG. 9, Vin is supplied across input nodes N5 and N6. N6 is coupled to the gates of n-channel MOS transistors M3 and M6, and N5 is connected to adder 200, which adds the potential at node N5 to $\pm V_c$ and supplies the sum to the gates of n-channel MOS transistors M4 and M5. The drains of transistors M3 and M5 are connected to power supply VCC through resistor $RL_1$ and the drains of resistors M4 and M6 are connected to power supply VCC through resistor $RL_2$. Currents $I_7$ and $I_8$ flow through resistors $RL_1$ and $RL_2$, respectively, and a final output voltage is generated across nodes P1 and P2.

The final output voltage between nodes P1 and P2 corresponding to the product of Vi (see FIG. 9) and Vb can be expressed in accordance with the following formula:

$$Vout = K1 \times Vi \times Vb,$$

where Vi (Vin±V$_c$) is the first input, Vb (the weight voltage) is the second input, and K1=R1×(2 Ka Kb)$^{1/2}$, Ka and Kb are constants determined by the gate length and gate width of the MOS transistors.

Figure 10:
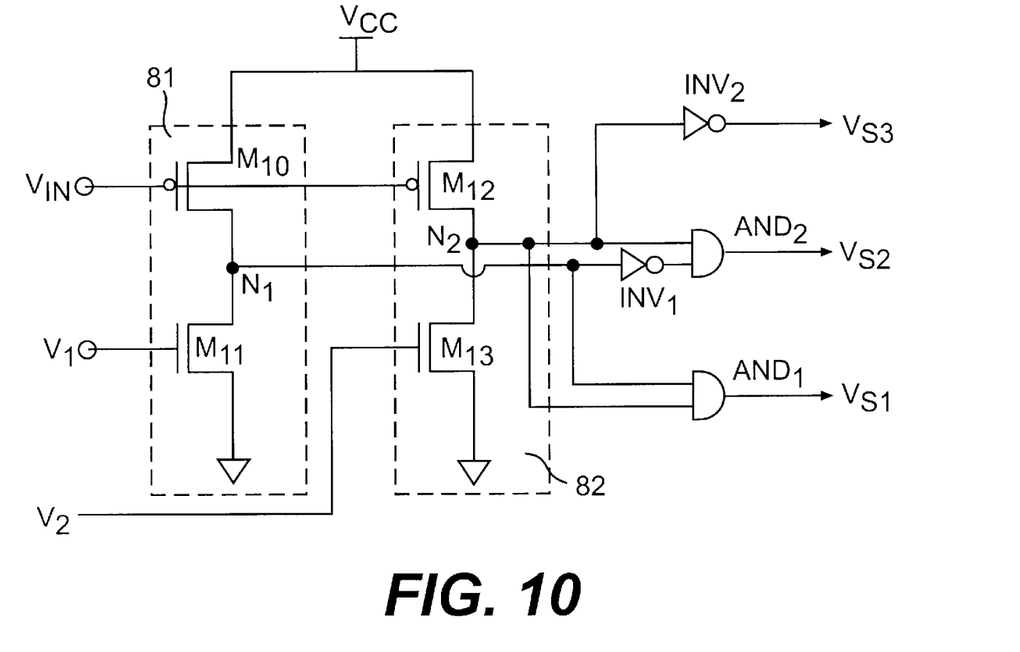
FIG. 10 illustrates a comparator circuit of the present invention.

A detailed explanation of comparator 70 will now be made with reference to FIG. 10. As noted above, comparator 70 receives two reference voltages V1 and V2, and outputs an input data comparison signal Scom on one of three output lines. Comparator 70 includes: first and second comparator sections 81 and 82, respectively; inverters INV1 and INV2; and AND gates AND1 and AND2.

The first comparison circuit 81 includes p-channel MOS transistor M10 having its drain connected to the drain of n-channel MOS transistor M11 through node N1. As further shown in FIG. 10, the sources of transistors M10 and M11 are connected to power supply V$_{cc}$ and ground, respectively, and the gates of transistors M10 and M11 receive input data signal Vin and reference voltage V1, respectively.

The second comparison circuit 82 includes p-channel transistor M12 and n-channel transistor M13, the sources of which are connected to power supply V$_{cc}$ and ground, respectively. The gates of transistors M12 and M13 respectively receive input data signal Vin and reference voltage V2, and the drains of these transistors are connected to each other through node N2.

AND gate AND1 receives signals appearing at nodes N1 and N2, and, in response thereto, generates a first data comparison signal VS1 on one of the output lines of comparator 70. AND gate AND2 receives the signal appearing at node N2 and the signal appearing at node N1 inverted by inverter INV1. In response to these input signals, AND2 outputs a second data comparison signal VS2 on a second one of the output lines of comparator 70. Further, inverter INV2 inverts the signal appearing at node 2 to generate a third data comparison signal VS3 on a third one of the output lines of comparator 70.

Figure 11:
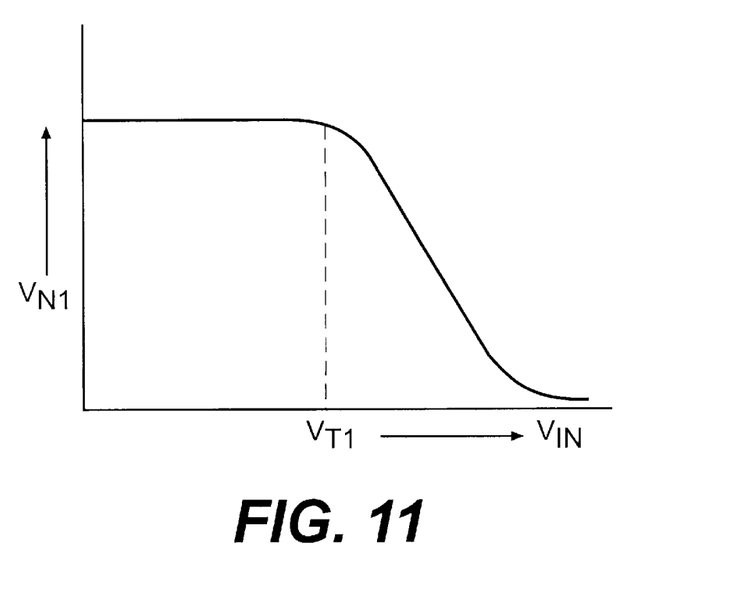
FIG. 11 is a graph showing input voltage vs. output voltage at node N1 of the circuit shown in FIG. 10.

The operation of comparison circuit 11 will now be described with reference to FIG. 11 illustrating the voltage at node N1, VN1, as a function the input data signal Vin. VN1 is maintained at a relatively high level provided that Vin is below threshold voltage VT1. Once Vin exceeds VT1, however, the voltage on node N1, VN1, drops sharply. VT1 is a function of the gate lengths and widths of transistors M10 and M11, as well as the value of reference voltage V1.

Figure 13:
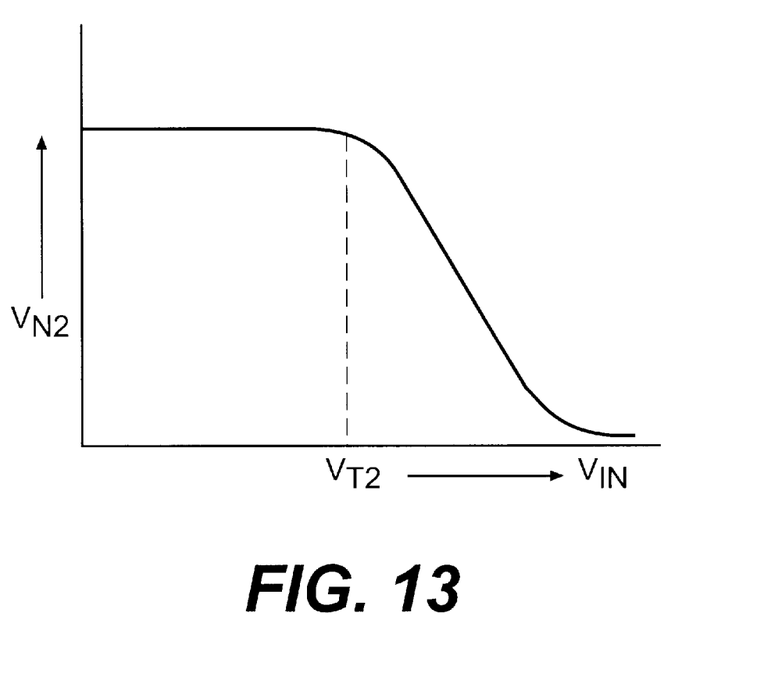
FIG. 13 is a graph showing input voltage vs. output voltage at node N2 of the circuit shown in FIG. 10.

A plot of the voltage at node N2 of the second comparison section 82, VN2, as a function of Vin, is shown in FIG. 13. This plot is similar to that shown in FIG. 11. However, the threshold voltage, VT2, at which VN2 drops is preferably greater than threshold voltage VT1. VT2 depends on the gate lengths and widths of transistors M12 and M13, as well as the value of reference voltage V2.

The operation of comparison circuit 70 will now be described. If the input data voltage is lower than threshold voltages VT1 and VT2, nodes N1 and N2 are maintained at a relatively high potential. Accordingly, the output of AND gate AND1, VS1, is also high, while the output of AND gate AND2, VS2, is low because the output of INV1 is low. Further, INV2 inverts the relatively high voltage signal present on node N2 to render VS3 low. Thus, only one of the three output lines of comparator 70 is high. In this case, the output line carrying signal VS1 is rendered high.

If the input data voltage signal vin is increased so that it is higher than VT1, but lower than VT2, node N1 is rendered low while node N2 remains at a high voltage. Thus, the output of AND gate AND1, VS1 is low. However, VS2 goes high because both inputs of AND gate AND2 are also high, but VS3 remains low because inverter INV2 continues to invert the relatively high voltage present on node N2.

Further, if input data signal Vin is increased even further so that it is higher than both VT1 and VT2, then nodes N1 and N2 are both rendered low, and the outputs of AND gates AND1 and AND2, i.e., VS1 and VS2, are also both rendered low. However, the output line of comparator 70 carrying VS3 (i.e., the output of inverter INV2) is rendered high.

In summary, comparator 70 receives input data voltage 70 and compares it with threshold voltages VT1 and VT2 to selectively render one of signals VS1, VS2 or VS3 high on a corresponding one of three output line s of comparator 70.

As noted above, first analog switch 71 receives three reference voltages, as shown in FIG. 8A, so that a weight voltage corresponding to the input data comparison signal output from comparator 70 is determined. If the range of the input data voltage is less than threshold voltages VT1, VS1 is rendered high and transistor Q1 is turned on so that weight voltage V$_{BL}$ is output. If the range of the input data voltage is between threshold voltages VT1 and VT2, VS2 is rendered high and transistor Q2 is turned on so that weight voltage becomes V$_{BM}$ is output. Further, if the range of the input data voltage is above threshold voltage VT2, VS3 is set high and transistor Q3 is turned on such that weight voltage V$_{BH}$ is output.

After receiving the input data comparison signal Scom (including signals VS1, VS2 and VS3), first analog switch 71 selects weight voltages V$_{BL}$, V$_{BM}$ and V$_{BH}$, in accordance with the ranges of the input data voltage, and then feeds them to the analog multiplier 73.

References for determining weight voltage V$_B$ can be expressed by the following equation (1).

If Vin<VT1,V$_B$=V$_{BL}$

If VT1<Vin<VT2,V$_B$=V$_{BM}$

If V$_{in}$>VT2,V$_B$=V$_{BH}$ (1)

Second analog switch 72 receives three reference voltages V$_{C1}$–V$_{C3}$, as shown in FIG. 8B, so that a correction voltage according to the input data comparison signal output from comparator 70 is selected and output. If the range of the input data voltage is less than VT1, VS1 is set high and transistor Q4 is turned on so that correction voltage V$_{C1}$ is output. If the range of the input data voltage is between VT1 and VT2, VS2 is raised to a high level and transistor Q5 is turned on so that correction voltage V$_{C2}$ is output. Likewise, if the range of the input data voltage is above VT2, VS3 is set high and transistor Q6 is turned on such that correction voltage becomes V$_{C3}$ is output.

Thus, in response to receiving the input data comparison signal, second analog switch 72 selects one of correction voltages V$_{C1}$, V$_{C2}$ and V$_{C3}$, in accordance with which range input data voltage Vin fall. The selected correction voltage is then also fed to analog multiplier 73.

References for determining correction voltage V$_C$ can be expressed by the following equation (2).

If Vin<VT1,V$_V$=C$_{C1}$

If VT1<Vin<VT2,V$_C$=V$_{C2}$

If V$_{in}$>VT2,V$_C$=V$_{C3}$ (2)

As indicated above, the MOS Gilbert cell 100 shown in FIG. 9 receives the selected weight and corrected voltages and outputs a gamma corrected voltage, Vout across nodes P1 and P2 in response thereto.

The operation of Gilbert cell 100 will now be discussed with reference to equation (3) below:

$$V_{out} = k1 \times Vi \times V_B, \quad (3)$$

where Vi is the first input determined by adding or subtracting the correction voltage Vc to the input data voltage Vin, $V_B$ is the weight voltage or the second input to Gilbert cell 100, and $k1=RL^*(2KaKb)^{1/2}$ (Ka and Kb are constants determined by the gate lengths and width of the MOS transistors of the Gilbert cell, and RL is the resistance of one of load resistors $RL_1$ or $RL_2$.)

In the event that the correction voltage $V_c$ is subtracted from $V_{in}$:

$$Vout = k1(Vin - V_c)V_B \quad (4)$$
$$= k1VinV_B - k1V_cV_B$$

That is, analog multiplier 73 subtracts correction voltage $V_c$ from the input voltage $V_{in}$, and then multiplies the difference by the weight voltage $V_B$. The resulting product is then output as the final gamma corrected voltage.

Figure 12:
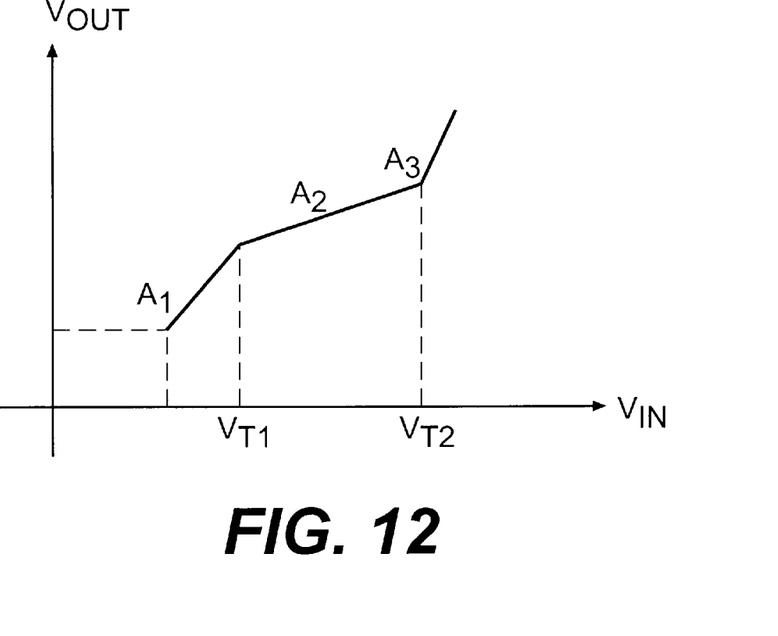
FIG. 12 is a graph showing the input/output characteristic of the gamma correction circuit in accordance with the present invention.

FIG. 12 is a graph illustrating the output characteristics of analog multiplier 73. Portions of the graph labeled A1–A3 will be described in detail below.

If Vin is less than VT1, then $V_B=V_{BL}$ and $V_c=V_{c1}$. Accordingly:

$$Vout = k1(Vin - V_{c1})V_{BL}$$
$$= k1VinV_{BL} - k1V_{c1}V_{BL},$$

such that analog multiplier 73 operates in region A1 of the graph shown in FIG. 12.

If Vin is greater than VT1 but less than VT2, then $V_B=V_{BM}$ and $V_c=V_{c2}$. Accordingly:

$$Vout = k1(Vin - V_{c2})V_{BM}$$
$$= k1VinV_{BM} - k1V_{c2}V_{BM},$$

such that analog multiplier 73 operates in region A2 of the graph shown in FIG. 12.

If Vin is greater than VT2, then $V_B=V_{BH}$ and $V_c=V_{c3}$. Accordingly:

$$Vout = k1(Vin - V_{c3})V_{BH}$$
$$= k1VinV_{BH} - k1V_{c3}V_{BH},$$

such that analog multiplier 73 operates in region A3 of the graph shown in FIG. 12.

In summary, in the gamma correction circuit including an analog multiplier, comparator, first and second analog switches 71 and 72, when data voltage Vin is input, the comparator compares the input voltage to determine whether the input voltage falls within one of three voltage ranges. The first voltage range constitutes those voltage less than a first threshold voltage corresponding to a first reference voltage; the second range constitutes those voltages greater than the first threshold voltage but less than a second threshold voltage corresponding to a second reference voltage; and the third voltage range constitutes those voltages greater than the second threshold voltage. Depending on which range the input data signal falls, one of three output lines is set to a high level and supplied to first and second analog switches. In response to the high output line, analog switch 71 selects a weight voltage corresponding to the value of the input data voltage and supplies the result to the analog multiplier. Second analog switch 72 selects a correction voltage corresponding to the value of the input data voltage and also supplies the result to the analog multiplier. The analog multiplier preferably subtracts the selected correction voltage $V_c$ from the input data voltage and then multiplies the difference by the selected weight voltage $V_B$. The resulting product is the final gamma-corrected output voltage.

Unlike the conventional gamma correction circuit, the present invention applies the weight voltage and correction voltage to the analog multiplier, obtaining output voltages appropriate for various ranges of input voltages. Therefore, nonlinearities due to the electrooptic characteristic of the liquid crystal display can be made linear. In addition, the present invention eliminates D/A and A/D conversion circuitry required in the conventional digital gamma correction circuit, enabling gamma correction to be performed for a wide range of gradations. Furthermore, the present invention does not require differential amplifiers, thereby simplifying the design of the gamma correction circuit.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A gamma correction circuit for compensating nonlinear optical outputs of a liquid crystal display, said gamma correction circuit comprising:

a comparator circuit receiving an input data voltage signal and generating an input data comparison signal in response to a comparison of said input signal with a plurality of threshold voltages;

a first switch circuit receiving said input data comparison signal, said first switch circuit also receiving a plurality of weight voltages and selecting one of said weight voltages in response to said input data comparison signal;

a second switch circuit receiving said input data comparison signal, said second switch circuit also receiving a plurality of correction voltages and selecting one of said correction voltages in response to said input data comparison signal;

an adder circuit adding said selected one of said correction voltages to said input data voltage to generate a sum signal; and an output circuit receiving said sum signal and said selected one of said weight voltages and generating a final voltage in response thereto.

2. A gamma correction circuit in accordance with claim 1, wherein said comparator compares said input signal with a first range of voltages less than a first one of said plurality of threshold voltages, a second range of voltages greater than said first one of said plurality of threshold voltages and less than a second one of said plurality of threshold voltages, and a third range of voltages greater than said second one of said plurality of threshold voltages.

3. A gamma correction circuit in accordance with claim 2, wherein said first and second threshold voltages are selected accordance with a characteristic of said liquid crystal display.

4. A gamma correction circuit in accordance with claim 1, wherein said comparator circuit has a plurality of output lines and said input data comparison signal includes a data comparison signal supplied to one of said plurality of output lines, and said first switch includes a plurality of MOSFETs corresponding in number to a number of said plurality of weight voltages, each of said plurality of MOSFETs having a source, a drain, and a gate, said source of each of said plurality of MOSFETs is coupled to a corresponding one of said plurality of weight voltages, said drain of each of said plurality of MOSFETs is coupled to an output terminal of said first switch, and said gate of each of said plurality of MOSFETs is connected to a respective one of said plurality of output lines, one of said gates being selected in response to said data comparison signal being supplied to one of said plurality of output lines.

5. A gamma correction circuit in accordance with claim 1, wherein said comparator circuit has a plurality of output lines and said input data comparison signal includes a data comparison signal supplied to one of said plurality of output lines, and said second switch includes a plurality of MOSFETs corresponding in number to a number of said plurality of correction voltages, each of said plurality of MOSFETs having a source, a drain, and a gate, said source of each of said plurality of MOSFETs is coupled to a corresponding one of said plurality of correction voltages, said drain of each of said plurality of MOSFETs is coupled to an output terminal of said second switch, and said gate of each of said plurality of MOSFETs is connected to a respective one of said plurality of output lines, one of said gates being selected in response to said data comparison signal being supplied to one of said plurality of output lines.

6. A gamma correction circuit in accordance with claim 1, wherein said output circuit comprises a multiplier circuit.

7. A gamma correction circuit in accordance with claim 6, wherein said multiplier circuit further comprises an MOS Gilbert cell.

8. A gamma correction circuit in accordance with claim 1, wherein said plurality of weight voltages and said plurality of correction voltages may be preselected.

9. A gamma correction circuit in accordance with claim 1, wherein said first switch includes an analog switch.

10. A gamma correction circuit in accordance with claim 1, wherein said second switch includes an analog switch.

11. A gamma correction circuit in accordance with claim 1, wherein said each of said plurality of threshold voltages is related respectively to each of a plurality of reference voltages supplied to said comparator circuit.

12. A gamma correction circuit in accordance with claim 1, wherein said output circuit generates a product voltage corresponding to a product of said sum signal and said selected one of said plurality of weight voltages.

13. A gamma correction circuit in accordance with claim 1, wherein said selected correction voltage has a negative value.

14. A gamma correction circuit for compensating nonlinear optical outputs of a liquid crystal display, said gamma correction circuit comprising:

comparing means for receiving an input signal and generating an input data comparison signal in response to a comparison of said input signal with a plurality of threshold voltages;

a first switching means for receiving said input data comparison signal, said first switching means also for receiving a plurality of weight voltages and selecting one of said weight voltages in response to said input data comparison signal;

a second switching means for receiving said input data comparison signal, said second switching means also receiving a plurality of correction voltages and selecting one of said correction voltages in response to said input data comparison signal;

an adder means for adding said selected one of said correction voltages to said input data comparison signal to generate a sum signal; and an output means for receiving said sum signal and said selected one of said weight voltages and generating a final voltage in response thereto.

15. A gamma correction circuit in accordance with claim 14, wherein said comparing means compares said input signal with a first range of voltages less than a first one of said plurality of threshold voltages, a second range of voltages greater than said first one of said plurality of threshold voltages and less than a second one of said plurality of threshold voltages, and a third range of voltages greater than said second one of said plurality of threshold voltages.

16. A gamma correction circuit in accordance with claim 15, wherein said first and second ones of said plurality of threshold voltages are selected in accordance with the input signal and a characteristic of said liquid crystal display.

17. A gamma correction circuit in accordance with claim 14, wherein said comparing means has a plurality of output lines and said input data comparison signal includes a data comparison signal supplied to one of said plurality of output lines, and said first switch includes a plurality of MOSFETs corresponding in number to a number of said plurality of weight voltages, each of said plurality of MOSFETs having a source, a drain, and a gate, said source of each of said plurality of MOSFETs is coupled to a corresponding one of said plurality of weight voltages, said drain of each of said plurality of MOSFETs is coupled to an output terminal of said first switch, and said gate of each of said plurality of MOSFETs is connected to a respective one of said plurality of output lines, one of said gates being selected in response to said data comparison signal being supplied to one of said plurality of output lines.

18. A gamma correction circuit in accordance with claim 14, wherein said comparing means has a plurality of output lines and said input data comparison signal includes a data comparison signal supplied to one of said plurality of output lines, and said second switch includes a plurality of MOSFETs corresponding in number to a number of said plurality of correction voltages, each of said plurality of MOSFETs having a source, a drain, and a gate, said source of each of said plurality of MOSFETs is coupled to a corresponding one of said plurality of correction voltages, said drain of each of said plurality of MOSFETs is coupled to an output terminal of said second switch, and said gate of each of said plurality of MOSFETs is connected to a respective one of said plurality of output lines, one of said gates being selected in response to said input data comparison signal being supplied to one of said plurality of output lines.

19. A gamma correction circuit in accordance with claim 14, wherein said output means includes a multiplier circuit.

20. A gamma correction circuit in accordance with claim 19, wherein said multiplier circuit further comprises an MOS Gilbert cell.

21. A gamma correction circuit in accordance with claim 14, wherein said plurality of weight voltages and said plurality of correction voltages may be preselected.

22. A gamma correction circuit in accordance with claim 14, wherein said first switching means includes an analog switch.

23. A gamma correction circuit in accordance with claim 14, wherein said second switching means includes an analog switch.

24. A gamma correction circuit in accordance with claim 14, wherein each of said plurality of threshold voltages is respectively related to each of a plurality of reference voltages supplied to said comparing means.

25. A gamma correction circuit in accordance with claim 14, wherein said output means generates a product voltage corresponding to a product of said sum signal and said selected one of said plurality of weight voltages.

26. A gamma correction circuit in accordance with claim 14, wherein said selected correction voltage has a negative value.

27. A method for compensating nonlinear optical outputs of a liquid crystal display, said method comprising the steps of:

comparing an input signal with each of a plurality of threshold voltages and generating an input data comparison signal in response thereto;

selecting one of a plurality of weight voltages in response to said input data comparison signal;

selecting one of a plurality of correction voltages in response to said input data comparison signal;

adding said selected one of said plurality of correction voltages to said input signal to generate a sum signal; and generating a final voltage in response to said sum signal and said selected one of said weight voltages.

28. A method for compensating nonlinear optical outputs of a liquid crystal display in accordance with claim 27, wherein said comparing step further includes the step of comparing said input signal with a first range of voltages less than a first one of said plurality of threshold voltages, a second range of voltages greater than said first one of said plurality of threshold voltages and less than a second one of said plurality of threshold voltages, and a third range of voltages greater than said second one of said plurality of threshold voltages.

29. A method for compensating nonlinear optical outputs of a liquid crystal display in accordance with claim 27, wherein said comparing step includes comparing said input signal with first and second ones of said plurality of threshold voltages, said first and second ones of said threshold voltages are selected in accordance with a characteristic of said liquid crystal display.

30. A method for compensating nonlinear optical outputs of a liquid crystal display in accordance with claim 27, wherein said step of generating said final voltage includes a multiplication step.

31. A method for compensating nonlinear optical outputs of a liquid crystal display in accordance with claim 27, wherein said plurality of weight voltages and said plurality of correction voltages may be preselected.

32. A method for compensating nonlinear optical outputs of a liquid crystal display in accordance with claim 27, wherein said plurality of threshold voltages are selected in accordance with said input signal and a characteristic of said liquid crystal display.

33. A method for compensating nonlinear optical outputs of a liquid crystal display in accordance with claim 27, wherein said step of generating said final voltage includes the step of:

generating a product voltage corresponding to a product of said sum signal and said selected one of said plurality of weight voltages.

34. A method in accordance with claim 27, wherein said selected correction voltage has a negative value.

35. A gamma correction circuit comprising:

a comparator circuit comparing an input voltage with a plurality of threshold voltages and outputting a comparison signal in response to said comparison;

a selection circuit selecting a gamma correction parameter in response to said comparison signal; and a calculating circuit coupled to said selection circuit and calculating a gamma corrected voltage based on said selected gamma correction parameter by adding said gamma correction parameter to said input voltage.

* * * * *

UNITED STATES PATENT AND TRADEMARK OFFICE
CERTIFICATE OF CORRECTION

PATENT NO. : 5,933,199
DATED : August 3, 1999
INVENTOR(S) : Sang Young Yoon

Page 1 of 1

It is certified that error appears in the above-identified patent and that said Letters Patent is hereby corrected as shown below:

Claim 35, column 12,
Line 28, after "circuit" insert -- for generating a gamma corrected voltage consisting of an input voltage modified by a plurality of gamma correction parameters, said circuit --.
Line 32, after "a" (second occurrence) insert -- value of at least one of said -- and after "correction" change "parameter" to -- parameters --.
Line 36, change "parameter by" to -- parameters including --.
Line 37, change "gamma correction parameter" to -- selected value --.

Signed and Sealed this

Second Day of October, 2001

Attest:

NICHOLAS P. GODICI
Attesting Officer   Acting Director of the United States Patent and Trademark Office